(12) United States Patent
Chung

(10) Patent No.: US 10,308,229 B2
(45) Date of Patent: Jun. 4, 2019

(54) ELECTRONIC CONTROL BRAKE SYSTEM AND METHOD FOR CONTROLLING THE SAME

(71) Applicant: MANDO CORPORATION, Pyeongtaek-si, Gyeonggi-do (KR)

(72) Inventor: Seok-Hwan Chung, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/688,496

(22) Filed: Aug. 28, 2017

(65) Prior Publication Data

US 2018/0065602 A1 Mar. 8, 2018

(30) Foreign Application Priority Data

Sep. 5, 2016 (KR) .................. 10-2016-0113847

(51) Int. Cl.
| | |
|---|---|
| *B60T 1/02* | (2006.01) |
| *B60T 7/12* | (2006.01) |
| *B60T 8/172* | (2006.01) |
| *B60T 11/04* | (2006.01) |
| *B60T 11/10* | (2006.01) |

(Continued)

(52) U.S. Cl.
CPC .............. *B60T 7/122* (2013.01); *B60T 7/042* (2013.01); *B60T 8/172* (2013.01); *B60T 11/046* (2013.01); *B60T 11/102* (2013.01); *B60T 13/662* (2013.01); *B60T 8/32* (2013.01); *B60T 2201/06* (2013.01); *B60T 2260/04* (2013.01)

(58) Field of Classification Search
CPC ........ B60T 7/107; B60T 7/122; B60T 13/662; B60T 13/746; B60T 8/17; F16D 65/0075; F16D 65/18

USPC ............ 303/3, 15, 20; 701/40, 48; 188/2 D, 188/18 A, 70 R, 156–164, 218 R, 325
See application file for complete search history.

(56) References Cited

U.S. PATENT DOCUMENTS

2009/0260929 A1* 10/2009 Boyle .................. B60T 13/746
188/156
2010/0256886 A1* 10/2010 Irsigler .................. B60T 7/107
701/70

(Continued)

FOREIGN PATENT DOCUMENTS

| JP | 2014-024514 A | 2/2014 |
|---|---|---|
| KR | 10-2005-0093990 A | 9/2005 |
| KR | 10-2012-0058733 A | 6/2012 |

*Primary Examiner* — Christopher P Schwartz
(74) *Attorney, Agent, or Firm* — Morgan Lewis & Bockius LLP

(57) ABSTRACT

Disclosed are an electronic control brake system and a method for controlling the same. The method for controlling an electronic control brake system of a vehicle according to the present disclosure, in which a service brake is configured to provide a braking force by hydraulic pressure to each wheel and a drum in hat (DIH) brake is configured to provide a parking brake force to each of the wheels by pulling a parking cable, the method including determining whether rocking of the vehicle occurs due to a weight shift of the vehicle at the DIH brake on the basis of operation information of an electronic parking brake (EPB) system configured to adjust a braking force of the DIH brake, state information of a transmission gear, and state information of a brake pedal; and when the rocking of the vehicle is determined to occur, automatically operating the service brake.

8 Claims, 5 Drawing Sheets

(51) Int. Cl.
 B60T 13/66 (2006.01)
 B60T 7/04 (2006.01)
 B60T 8/32 (2006.01)

(56) References Cited

U.S. PATENT DOCUMENTS

| | | | | |
|---|---|---|---|---|
| 2012/0073922 | A1* | 3/2012 | Kaestner | B60L 7/18 |
| | | | | 188/70 R |
| 2015/0224969 | A1* | 8/2015 | Huennekens | B60T 8/17 |
| | | | | 701/48 |
| 2017/0106848 | A1* | 4/2017 | Ritter | F16D 65/18 |
| 2017/0210361 | A1* | 7/2017 | Kotera | B60T 8/17 |

* cited by examiner

ELECTRONIC CONTROL BRAKE SYSTEM AND METHOD FOR CONTROLLING THE SAME

This application claims the benefit of Korean Patent Application No. 2016-0113847, filed on Sep. 5, 2016 in the Korean Intellectual Property Office, the disclosure of which is incorporated herein by reference.

BACKGROUND

1. Field

Embodiments of the present disclosure relate to an electronic control brake system and a method for controlling the same, and more particularly, to an electronic control brake system and a method for controlling the same, which are capable of preventing rocking of a vehicle that is mounted with a drum in hat (DIN) brake-based electronic parking brake (hereinafter, referred to as an DIH EPB) system.

2. Description of the Related Art

Generally, a brake device is a mechanical device that performs a braking operation by converting kinetic energy of a vehicle into thermal energy and the like using a force, e.g., a friction force, generated by a manipulation force of a driver or auxiliary power. The brake device used in a vehicle includes a service brake that is operated by a manipulation while a driver is driving the vehicle, and a parking brake that is operated by a manipulation of the driver for the purpose of stopping or parking the vehicle.

Among the brake devices, the service brake is classified into a disc brake and a drum brake according to a structure of the service brake. The disc brake is configured with a structure in which pads, which are provided at both sides of a disc, squeeze the disc that rotates with a wheel, and is widely mounted on a front wheel of the vehicle, while the drum brake is configured with a structure in which a pair of brake shoes, which are provided inside a drum, extend to brake the drum that rotates with a wheel, and is mainly mounted on a rear wheel of the vehicle. In this case, the drum brake mounted on the rear wheel serves as a parking brake in addition to a service brake.

For example, to describe in more detail, a drum brake is connected to a parking brake lever, which is provided in an interior of a vehicle, through a cable, and brake shoes, which are pulled by the cable when a driver manipulates the parking brake lever, are in close contact with a brake drum to generate a braking force.

Meanwhile, in recent years, a disc brake is also used at a rear wheel of a vehicle instead of a drum brake, and, when the disc brake is used at the rear wheel, a parking brake is separately provided from the disc brake, and this is implemented by a DIH brake. That is, the DIH brake is a brake in which the drum brake is provided inside the disc brake.

In a vehicle to which an DIH EPB system is applied, there is a structure in which a service brake generates a braking force through a contact between pads of a caliper and a disc by a hydraulic pressure, and a DIH brake generates a braking force through contact between a lining and a drum by pulling a cable through driving of a motor to allow brake shoes inside the drum to extend.

After an EPB apply is performed, when a driver steps on an accelerator pedal at a driving gear, a driver's intent for moving a vehicle is determined and thus a drive away release (DAR) function for automatically releasing the EPB is executed.

In the DIH EPB, when a transmission gear is shifted into a driving gear after the EPB apply is performed, the vehicle generates a forward force or a backward force, and, at this point, rocking of the vehicle may occur in forward and backward directions due to a structure of the DIH brake.

PRIOR ART DOCUMENT

Patent Document (Patent Document 1) Korean Registered Patent No. 10-1394124

SUMMARY

Therefore, it is an aspect of the present disclosure to provide an electronic control brake system and a method for controlling the same, which are capable of preventing a vehicle mounted with a drum in hat (DIH) electronic parking brake (EPB) system from rocking which occurs when a driving gear is shifted or a service brake is released in a state in which an EPB apply is performed.

Additional aspects of the disclosure will be set forth in part in the description which follows and, in part, will be obvious from the description, or may be learned by practice of the disclosure.

According to one aspect of the present disclosure, there is provided a method for controlling an electronic control brake system of a vehicle which is mounted with a service brake configured to provide a braking force by hydraulic pressure to each wheel, and a DIH brake configured to provide a parking braking force by pulling of a parking cable to each of the wheels, the method including determining whether rocking of the vehicle occurs due to a weight shift of the vehicle at the DIH brake on the basis of operation information of an EPB system configured to adjust a braking force of the DIH brake, state information of a transmission gear, and state information of a brake pedal; and when the rocking of the vehicle is determined to occur, automatically operating the service brake.

Also, when a parking and stopping gear is shifted into a driving gear after an EPB parking apply is performed, or the brake pedal is released at the driving gear after the EPB parking apply is performed, the determining may determine that the rocking of the vehicle occurs.

Also, when the brake pedal is released in a state of a neutral gear of the vehicle on a slope after the EPB parking apply is performed, the determining may determine that the rocking of the vehicle occurs.

Also, the operating of the service brake may include automatically operating the service brake using an auto vehicle hold (AVH) function of an AVH system that automatically maintains a braking force of the vehicle, which is stopped, without the driver stepping on the brake pedal.

According to another aspect of the present disclosure, there is provided a method for controlling an electronic control brake system of a vehicle which is mounted with a service brake configured to provide a braking force by hydraulic pressure to each wheel, and a DIH brake configured to provide a parking braking force by pulling of a parking cable to each of the wheels, the method including determining whether at least one of cases, in which a parking and stopping gear is shifted into a driving gear after an EPB parking apply is performed, a brake pedal is released at the driving gear after the EPB parking apply is performed, and the brake pedal is released in a state of a neutral gear of the vehicle on a slope after the EPB parking apply is performed, is satisfied on the basis of operation information of an EPB system configured to adjust a braking force of the DIH brake, state information of a transmission gear, gradient information of the vehicle, and state information of the brake pedal, and, when the at least one case is determined to be satisfied, automatically operating the service brake.

According to still another aspect of the present disclosure, there is provided an electronic control brake system of a vehicle which is mounted with a service brake configured to provide a braking force by hydraulic pressure to each wheel, and a DIH brake configured to provide a parking braking force by pulling of a parking cable to each of the wheels, the system including an EPB system configured to control the parking braking force of the DIH brake using an EPB actuator that operates the DIH brake; and an AVH system connected to the EPB system through a network, and configured to control the braking force of the service brake using a hydraulic pressure actuator that adjusts brake hydraulic pressure provided to the service brake, wherein the EPB system determines whether rocking of the vehicle occurs due to a weight shift of the vehicle at the DIH brake on the basis of operation information of the EPB system, state information of a transmission gear, gradient information of the vehicle, and state information of a brake pedal, and, when the rocking of the vehicle is determined to occur, the EPB system requests the AVH system to operate the service brake, and according to the request from the EPB system, the AVH system operates the service brake.

Also, when at least one of cases, in which a parking and stopping gear is shifted into a driving gear after an EPB parking apply is performed, the brake pedal is released at the driving gear after the EPB parking apply is performed, and the brake pedal is released in a state of a neutral gear of the vehicle on a slope after the EPB parking apply is performed, is satisfied, the EPB system may determine that the rocking of the vehicle occurs.

According to yet another aspect of the present disclosure, there is provided an electronic control brake system of a vehicle which is mounted with a service brake configured to provide a braking force by hydraulic pressure to each wheel, and a DIH brake configured to provide a parking braking force by pulling of a parking cable to each of the wheels, the system including an EPB system configured to control the parking braking force of the DIH brake using an EPB actuator that operates the DIH brake; and an AVH system connected to the EPB system through a network, and configured to control the braking force of the service brake using a hydraulic pressure actuator that adjusts brake hydraulic pressure provided to the service brake, wherein the EPB system determines whether at least one of cases, in which a parking and stopping gear is shifted into a driving gear after an EPB parking apply is performed, a brake pedal is released at the driving gear after the EPB parking apply is performed, and the brake pedal is released in a state of a neutral gear of the vehicle on a slope after the EPB parking apply is performed, is satisfied on the basis of operation information of the EPB system, state information of a transmission gear, gradient information of the vehicle, and state information of the brake pedal, and, when the at least one case is determined to be satisfied, the EPB system requests the AVH system to operate the service brake, and according to the request from the EPB system, the AVH system operates the service brake.

DETAILED DESCRIPTION

Figure 1:
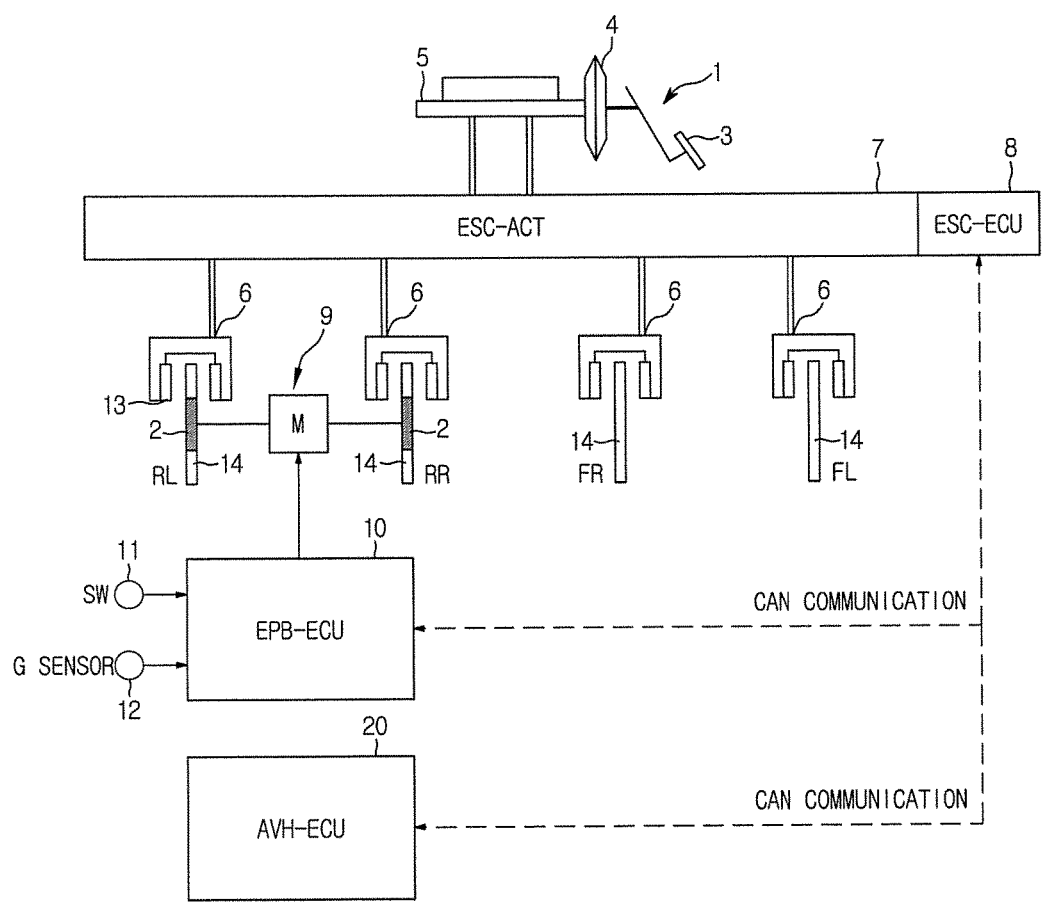
FIG. 1 is a block diagram of an electronic control brake system according to one embodiment of the present disclosure.

Hereinafter, embodiments of the present disclosure will be described in detail with reference to the accompanying drawings. The embodiments to be described below are provided as examples so as to fully convey the spirit of the present disclosure to those skilled in the art. The present disclosure is not limited to the embodiments disclosed herein and may be implemented in other forms. In order to clearly describe the present disclosure, parts not related to the description will omitted from the drawings, and, in the drawings, widths, lengths, thicknesses, and the like of components may be exaggerated for convenience. Throughout the disclosure, the same reference numerals indicate the same components.

Also, hereinafter, an electronic control brake system according to the present embodiment limited to being applied to a vehicle mounted with a DIH brake based cable puller type EPB system will be described, and, for convenience of description, it is limited by describing that a service brake of a disc brake type is applied to a front wheel and a DIH brake is applied to a rear wheel, but the electronic control brake system is not limited thereto and is applicable to various modified forms.

Generally, when an EPB is applied, a user continuously steps on a brake pedal and pulls an EPB switch in an apply direction in a state in which vehicle stability is secured, thereby applying a parking braking force. This is because of user behavior for applying the parking braking force in a state in which the vehicle stability is secured, and it is an operation situation which is considered more on a slope where rolling always occurs without the help of the brake pedal after the vehicle is stopped as well as on flat ground. A temporary backward jolt of the vehicle occurs on the slope due to lifting of brake shoes in the DIH brake, and, at this point, front and rear wheel service brakes are in a fixed state due to squeezing of brake pads by an operation of the brake pedal, and a DIH brake of a rear wheel is in a state in which the parking brake is pulled by an operation of an EPB actuator and the brake shoes extend.

However, since the vehicle is in a state of being stopped due to a previously applied braking force of the brake pedal, a drum of the DIH brake is in a lifted state, in which the brake shoes extend and are only in contact with an inner circumferential surface of the drum, which is difficult to be determined as the brake shoes are completely stuck. At this point, when the user recognizes completion of the EPB apply and withdraws his or her foot from the brake pedal, the vehicle, which is obtaining the braking force from the service brake using both the front wheel and the rear wheel, instantaneously relies on only the braking force of the DIH brake of the rear wheel.

The DIH brake is stuck due to an abrupt braking force shift, but, for a short time before the DIH brake is stuck, a backward jolt of the vehicle occurs. Also, due to a weight shift of the vehicle, a variation occurs in the DIH brake before and after releasing of the brake pedal. Until the brake shoes, which are almost in contact with the drum, are completely in contact with the drum, the brake shoes receive the weight shift of the vehicle to rotate in a downward direction of a vehicle body. As a result, a movement of the entire DIH brake or the center of gravity thereof occurs and thus the brake shoes are completely stuck to an inner circumferential surface of the drum. Through an operation method of slowly withdrawing his or her foot from the brake pedal, even in a situation in which the braking force is assisted until the brake shoes are stuck to the inner circumferential surface of the drum, a lesser degree of movement of the center of gravity of the DIH brake and less rocking of the vehicle are present. Such a phenomenon occurs in the same way even when a driving gear is shifted in a state in which the EPB apply is performed.

Accordingly, in the case that rocking of the vehicle mounted with the DIH EPB system may occur due to the weight shift of the vehicle, which is applied to the DIH brake, such as when the driving gear is shifted in a state in which the EPB apply is performed or the service brake is released, in the present embodiment, the service brake is automatically operated to prevent the vehicle from rocking in forward and backward directions.

FIG. 1 is a schematic diagram of an electronic control brake system according to one embodiment of the present disclosure.

Referring to FIG. 1, the electronic control brake system is provided with a service brake 1 configured to generate a braking force on the basis of a stepping force of a driver, and a DIH brake 2 configured to restrict a movement of a vehicle when parked.

The service brake 1 boosts the stepping force, which is applied to a brake pedal 3 by the driver, in a booster 4, generates brake hydraulic pressure inside a master cylinder 5 according to the boosted stepping force, and provides the brake hydraulic pressure to a wheel cylinder 6 provided at a brake mechanism of each wheel, thereby generating a braking force.

An actuator 7 (hereinafter, limitedly described as an electronic stability control (ESC) actuator 7) configured to adjust the brake hydraulic pressure is provided between the master cylinder 5 and the wheel cylinder 6. The ESC actuator 7 is configured with a structure capable of adjusting the braking force that is generated by the service brake 1, and performing various controls for improving the stability of the vehicle.

The various controls using the ESC actuator 7 are executed in an ESC controller 8 (hereinafter, referred to as an *** electronic control unit (ECU) 8). For example, the ESC ECU 8 outputs a control current for controlling various control valves and a motor for driving a pump, which are provided at the ESC actuator 7, and controls a brake hydraulic pressure circuit provided at the ESC actuator 7, thereby controlling a braking pressure of the wheel cylinder 6. For instance, when a braking operation is performed, the ESC actuator 7 typically directly delivers a master cylinder pressure generated inside the master cylinder 5 to the wheel cylinder 6, but, when an ESC control is performed or required, the ESC actuator 7 may simultaneously control an ON or OFF operation of each of the various control valves and the motor for driving a pump, thereby increasing or decreasing pressure in the wheel cylinder 6 and preventing the wheels from being locked.

Also, the ESC actuator 7 may drive the various control valves and the motor for driving a pump, thereby automatically pressurizing the pressure in the wheel cylinder 6, and, when pressure is not generated in the master cylinder 5 or the pressure in the wheel cylinder 6 is required to be generated over the pressure in the master cylinder 5, the ESC actuator 7 may generate a high braking force on the basis of an automatic pressurizing function. In the present embodiment, the ESC actuator 7 and the ESC ECU 8 correspond to a brake hydraulic pressure system configured to control a braking force using the service brake 1.

Meanwhile, the DIH brake 2 is configured such that a drum brake is provided inside a disc brake, and is disclosed in Korean Patent Application Publication No. 10-2010-0018306. Referring to the above-described Korean Patent Application Publication, the DIH brake 2 includes a mounting plate, a pair of brake shoes installed on a front surface of the mounting plate, an operating lever provided between lower end portions of the pair of brake shoes and configured to extend the pair of brake shoes when a parking brake lever is manipulated, a gap adjuster provided between upper end portions of the pair of brake shoes and configured to adjust gaps between the pair of brake shoes and a drum, and a retuning spring coupled to lower portions of the pair of brake shoes. When the operating lever is moved by a manipulation of the parking brake lever, the pair of brake shoes extend to the drum that is fixed to a wheel, and a lining mounted on each of the pair of brake shoes and the drum mutually rub so that a parking braking force is generated, and, when the parking brake lever is manipulated again and the parking braking force is released, the pair of brake shoes return to their original positions by an elastic force of the returning spring.

The DIH brake 2 is connected to an EPB actuator 9 that is configured with a brake mechanism including a motor M connected to a parking cable. The EPB actuator 9 is controlled by an EPB controller 10 (hereinafter, referred to as an EPB ECU 10), drives the motor M through the EPB ECU 10, and controls the brake mechanism, thereby generating the braking force.

The EPB ECU 10 is configured with a microcomputer that is provided with a central processing unit (CPU), a read-only memory (ROM), a random access memory (RAM), input/output (I/O) ports, and the like, and controls rotation of the motor M according to a program stored in the ROM and the like, thereby performing parking brake control such as parking apply control or parking apply release when the vehicle is parked or stopped.

The EPB ECU 10 and the ESC ECU 8 may transmit and receive information to and from each other through controller area network (CAN) communication which is a network inside the vehicle. Accordingly, when performing the parking brake control, the EPB ECU 10 may receive various pieces of information such as brake pedal state information, transmission gear state information, and the like which are stored in the ESC ECU 8. For reference, the EPB ECU 10 may receive the transmission gear state information from an ECU of an automatic transmission device connected to the CAN communication network of the vehicle.

The EPB ECU 10 receives a signal according to a manipulation state of an EPB switch 11 that is provided at a manipulation panel inside the vehicle, and drives the EPB actuator 9 according to the signal.

More particularly, the EPB ECU 10 rotates the motor M in a forward or reverse direction or stops the motor M on the basis of an operation of the EPB switch 11 and a current flowing in the motor M, thereby controlling an operation of the DIH brake 2.

The EPB ECU 10 may receive a signal of a gradient (G) sensor 12 configured to sense a gradient of the vehicle, and determine whether the vehicle is parked on a hill on the basis of the received signal. That is, the EPB ECU 10 senses the gradient of the vehicle through the G sensor 12, and determines whether the vehicle is parked on the hill on the basis of the sensed gradient information of the vehicle.

As is described above, in the electronic control brake system according to the present embodiment, the brake mechanism provided at each wheel is configured with a mechanical structure that generates the braking force, and a brake mechanism of a front wheel is configured with a structure that generates a braking force by a manipulation of the service brake 1, while a brake mechanism of a rear wheel is configured with a DIH brake structure.

When compared to the brake mechanism of the rear wheel, the braking mechanism of the front wheel is a brake mechanism that is typically used by excluding a mechanism which generates a braking force on the basis of a manipulation of the EPB actuator 9. That is, the brake mechanism of the front wheel squeezes a brake pad 13 to a brake disc 14 according to the manipulation of the service brake 1 by the driver, thereby generating the braking force with respect to each wheel. Also, in addition to the manipulation of the service brake 1 by the driver, the brake mechanism of the rear wheel enables the pair of brake shoes to be in close contact with the brake drum according to an operation of the EPB actuator 9, thereby generating the braking force.

In the present embodiment, the ESC actuator 9 and the ESC ECU 10 correspond to the EPB system configured to control the braking force using the DIH brake 2.

Also, an auto vehicle hold (AVH) ECU 20 performs an AVH function that automatically maintains the braking force of the vehicle, which is stopped, without the driver stepping on the brake pedal 3. This AVH function is a function that, in a state in which a transmission gear of the vehicle is positioned at one of a driving (D) stage, a reverse (R) stage, and a neutral (N) stage, the driver steps on the brake pedal 3 for the purpose of waiting for a signal or stopping the vehicle while the vehicle is being driven, and, when the vehicle is in a state of being completely stopped, a brake operation state is maintained and thus a state of the vehicle being stopped is maintained even when the driver withdraws his or her foot from the brake pedal 3. At this point, the D stage is a transmission position at which the transmission gear corresponds to a driving gear, and the R stage is a transmission position at which the transmission gear corresponds to a reverse gear, and the N stage is a transmission position at which the transmission gear corresponds to a neutral gear.

The AVH ECU 20 operates the service brake 1 to generate the braking force.

The AVH ECU 20 is configured with a microcomputer that is provided with a CPU, a ROM, a RAM, I/O ports, and the like, and performs AVH control, such as an auto hold operation, an auto hold operation release, and the like, according to a program stored in the ROM and the like.

The AVH ECU 20 and the ESC ECU 8 may transmit and receive information to and from each other through the CAN communication which is the network inside the vehicle, thereby performing cooperative control. Accordingly, when executing the AVH control, the AVH ECU 20 may request the ESC ECU 8 to operate the service brake 1, thereby generating the braking force.

The AVH ECU 20 and the EPB ECU 10 may transmit and receive information to and from each other through the CAN communication which is the network inside the vehicle, thereby performing cooperative control. Consequently, according to a request from the EPB ECU 10, the AVH ECU 20 may operate the service brake 1 to generate the braking force.

Figure 2:
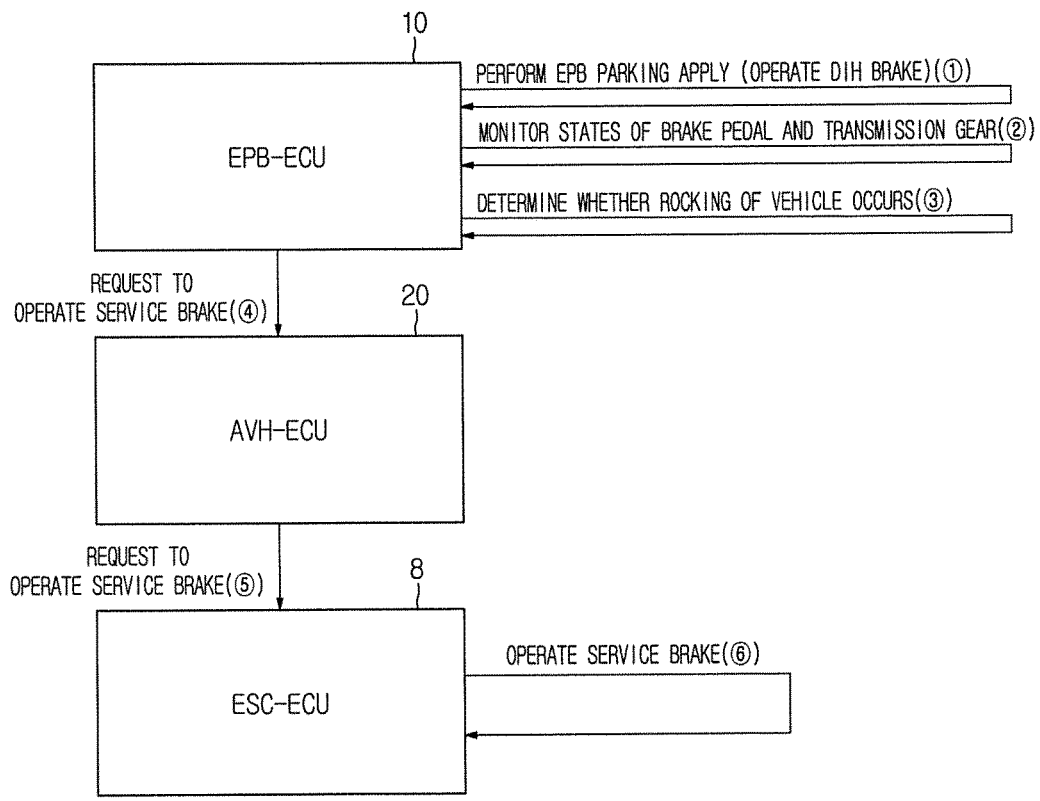
FIG. 2 is a diagram for describing an information flow between systems in the electronic control brake system according to one embodiment of the present disclosure.

FIG. 2 is a diagram for describing a flow of information between systems in the electronic control brake system according to one embodiment of the present disclosure.

Looking at FIG. 2 with reference to FIG. 1, the EPB ECU 10 performs EPB parking apply according to an input of the EPB switch 11 (①). Accordingly, the DIH brake 2 is operated by the EPB actuator 9 and thus a parking braking force is generated at each of a rear right (RR) wheel and a rear left (RL) wheel.

In a state in which the EPB parking apply is performed, the EPB ECU10 monitors states of the brake pedal 3 and the transmission gear (②).

On the basis of the monitoring results for the states of the brake pedal 3 and the transmission gear in the state in which the EPB parking apply is performed, the EPB ECU 10 determines whether rocking of the vehicle occurs due to a weight shift of the vehicle at the DIH brake 2 (③). When a parking and stopping gear is shifted into a driving gear after the EPB parking apply is performed, or the service brake 1 is released at the driving gear after the EPB parking apply is performed, the EPB ECU 10 determines that the rocking of the vehicle occurs due to the weight shift of the vehicle at the DIH brake 2. Also, in a state in which the vehicle is stopped on a hill at a neutral gear, when the service brake 1 is released after the EPB parking apply is performed, the EPB ECU determines that the rocking of the vehicle occurs due to the weight shift of the vehicle at the DIH brake 2.

The EPB ECU 10 requests the AVH ECU 20 to operate the service brake 1 (④).

According to the request from the EPB ECU 10, the AVH ECU 20 requests for the ESC ECU 8 to operate the service brake 1 (⑤).

According to the request from the AVH ECU 20, the ESC ECU 8 operates the service brake 1 using the ESC actuator 7 (⑥). Particularly, the ESC ECU 8 controls various control valves and a motor for driving a pump which are provided at the ESC actuator 7 and automatically pressurizes the pressure in each wheel cylinder, thereby generating a braking force required for each wheel. Accordingly, due to a structural characteristic of the DIH brake 2, the vehicle may be prevented from rocking in forward and backward directions.

Meanwhile, when the driver turns off the EPB switch 11 and thus the EPB parking apply coupled with a drive away release (DAR) is released, the driving gear is shifted into the parking and stopping gear, or a starting of the vehicle is turned off, the operation of the service brake 1, which is operated using the above-described AVH function, may be released.

Figure 3:
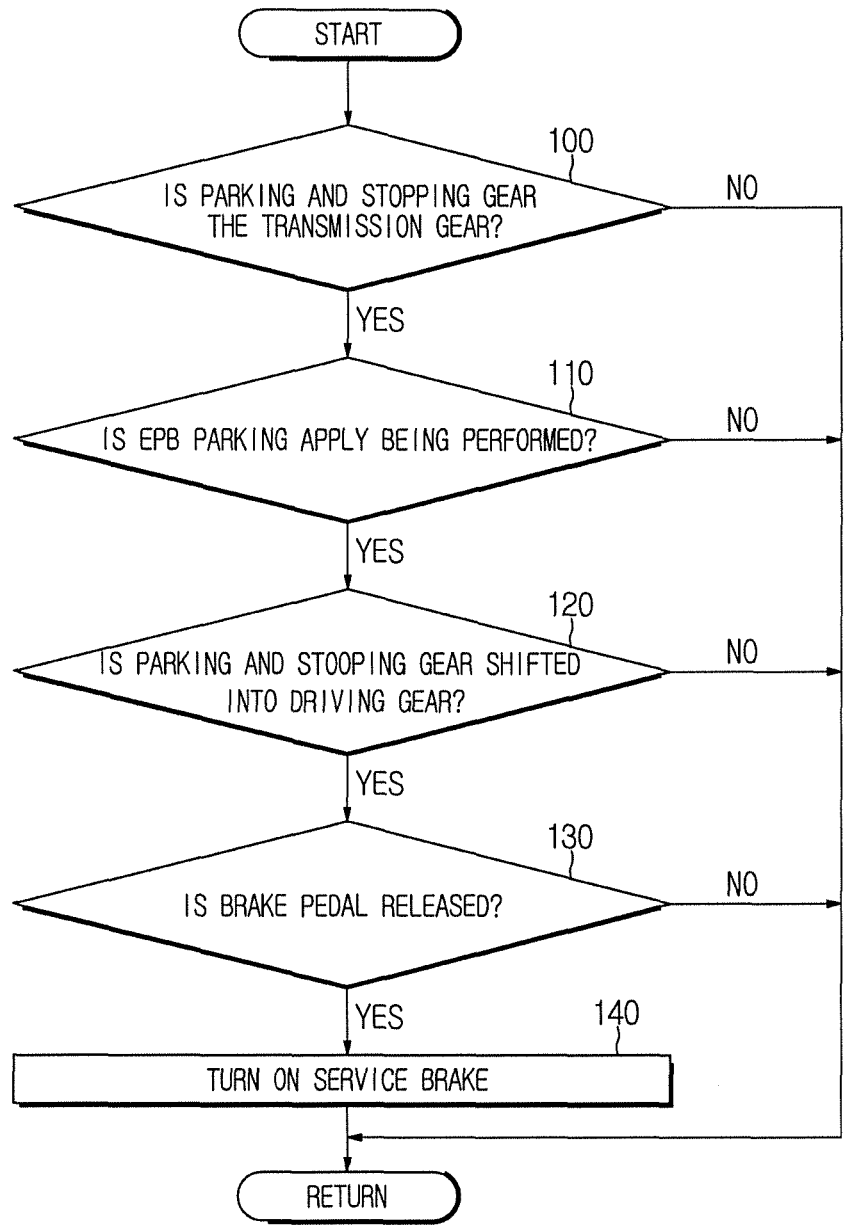
FIG. 3 is a control flowchart of the electronic control brake system according to one embodiment of the present disclosure.

FIG. 3 is a control flowchart of the electronic control brake system according to one embodiment of the present disclosure.

Referring to FIG. 3, the electronic control brake system determines whether a transmission gear is a parking and stopping gear in operation 100.

As the determination result in operation 100, when the transmission gear is a parking (P) stage which is the parking and stopping gear, the electronic control brake system determines whether the EPB parking apply is currently performed in operation 110.

As the determination result in operation 110, when the EPB parking apply is currently performed, the electronic control brake system determines whether the transmission gear is shifted from the P stage into a D stage which is a driving gear in operation 120 and also whether the brake pedal 3 is released in operation 130.

As the determination results in operations 120 and 130, when the transmission gear is shifted from the P stage into the D stage which is the driving gear and also the brake pedal 3 is released, the electronic control brake system turns on the service brake 1 in operation 140. At this point, the turning on of the service brake 1 means that the service brake 1 is operated to generate the braking force. Accordingly, the rocking of the vehicle may be prevented from occurring due to a weight shift of the vehicle at the DIH brake 2 such that the vehicle may be prevented from rocking in forward and backward directions.

That is, after the EPB parking apply is performed, when the transmission gear is shifted from the parking and stopping gear into the driving gear, the service brake 1 is automatically operated such that the rocking of the vehicle may be prevented due to the weight shift of the vehicle at the DIH brake 2.

Figure 4:
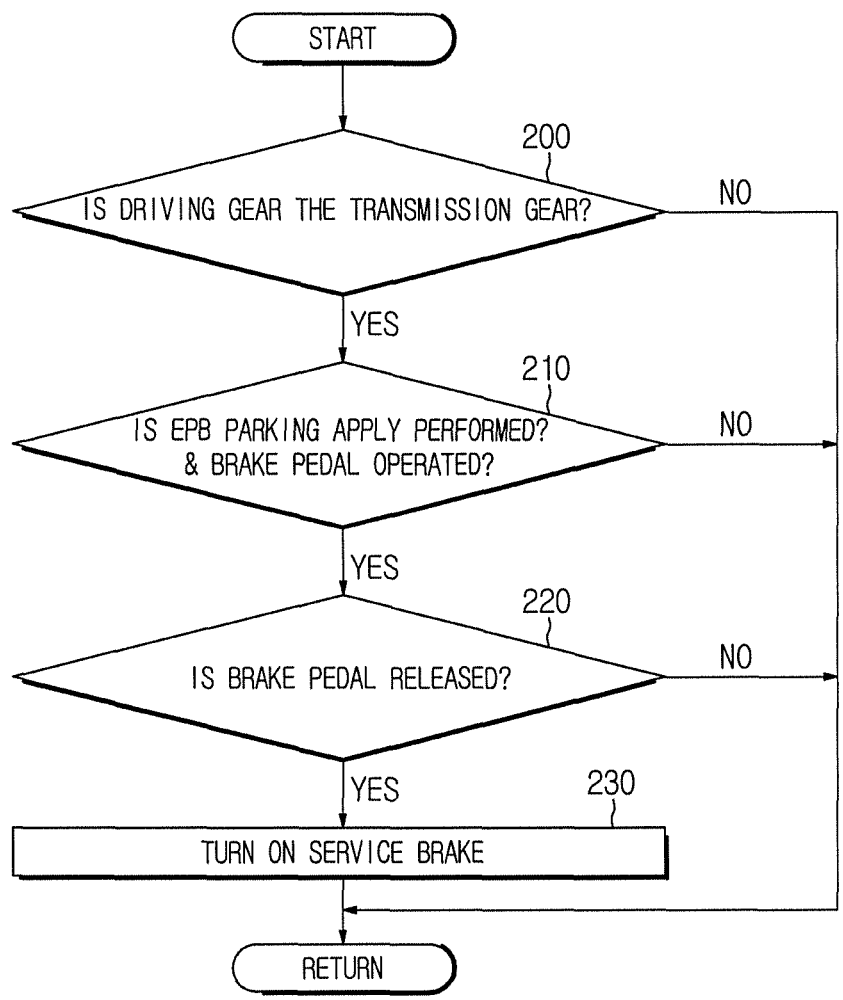
FIG. 4 is a control flowchart of an electronic control brake system according to another embodiment of the present disclosure.

FIG. 4 is a control flowchart of the electronic control brake system according to another embodiment of the present disclosure.

Referring to FIG. 4, the electronic control brake system first determines whether the transmission gear is the driving gear in operation 200.

As the determination result in operation 200, when the transmission gear is the D stage which is the driving gear, the electronic control brake system determines whether the EPB parking apply is currently performed and the brake pedal 3 is currently operated in operation 210.

As the determination result in operation 210, when the EPB parking apply is currently performed and the brake pedal 3 is currently operated, the electronic control brake system determines whether the brake pedal 3 is released in operation 220.

As the determination result in operation 220, when the brake pedal 3 is released, the electronic control brake system turns on the service brake 1 in operation 230. Accordingly, the rocking of the vehicle may be prevented from occurring due to a weight shift the vehicle at the DIH brake 2 such that the vehicle may be prevented from rocking in forward and backward directions.

That is, after the EPB parking apply is performed, when the brake pedal 3 is released at the driving gear, the service brake 1 is automatically operated such that the rocking of the vehicle may be prevented due to the weight shift of the vehicle at the DIH brake 2.

Figure 5:
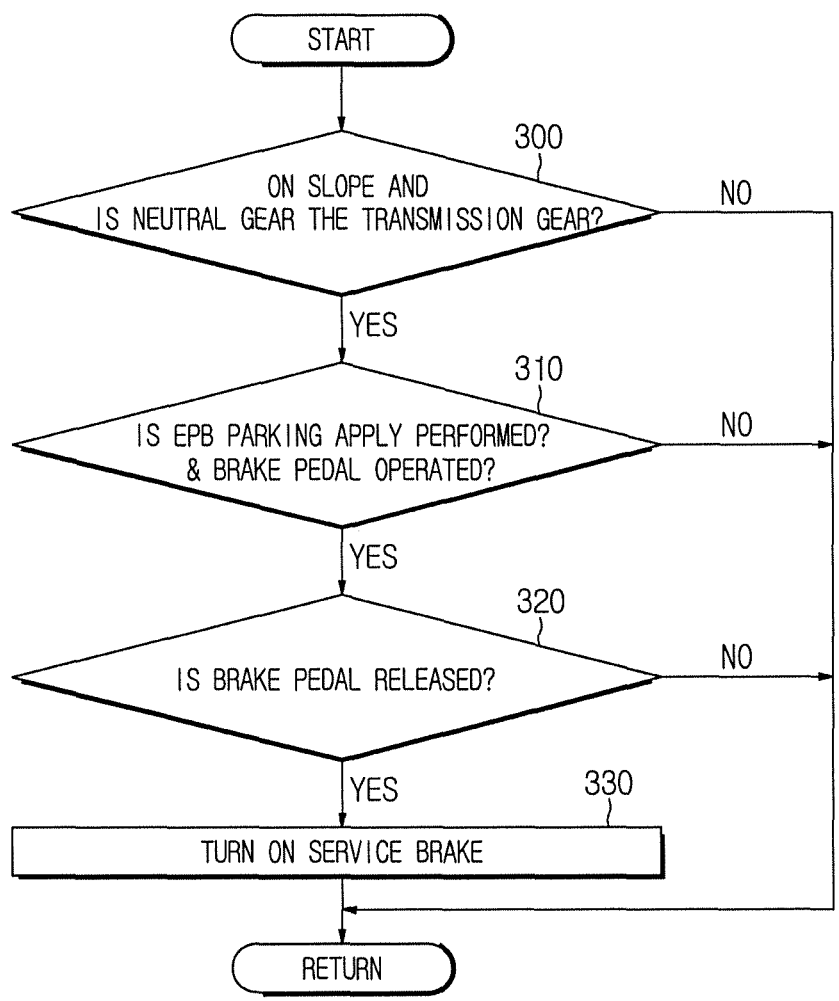
FIG. 5 is a control flowchart of an electronic control brake system according to still another embodiment of the present disclosure.

FIG. 5 is a control flowchart of the electronic control brake system according to still another embodiment of the present disclosure.

Referring to FIG. 5, the electronic control brake system determines whether the vehicle is stopped on a slope and the transmission gear is the neutral gear in operation 300.

As the determination result in operation 300, when the vehicle is stopped on the slope and the transmission gear is the neutral gear, the electronic control brake system whether the EPB parking apply is currently performed and the brake pedal 3 is currently operated in operation 310.

As the determination result in operation 310, when the EPB parking apply is currently performed and the brake pedal 3 is currently operated, the electronic control brake system determines whether the brake pedal 3 is released in operation 320.

As the determination result in operation 320, when the brake pedal 3 is released, the electronic control brake system turns on the service brake 1 in operation 330. Accordingly, the rocking of the vehicle may be prevented from occurring due to a weight shift of the vehicle at the DIH brake 2 such that the vehicle may be prevented from rocking in forward and backward directions.

That is, when the brake pedal 3 is released in a state of the neutral gear on the slope after the EPB parking apply is performed, the service brake 1 is automatically operated such that the rocking of the vehicle may be prevented due to the weight shift of the vehicle at the DIH brake 2.

According to the embodiment of the present disclosure, in the vehicle mounted with the DIH EPB system, when the driving gear is shifted or the service brake is released in a state when the EPB apply is performed, the service brake can be automatically operated to prevent the vehicle from rocking in forward and backward directions.

Further, according to the embodiment of the present disclosure, in the vehicle mounted with the DIH EPB system, when the driving gear is shifted or the service brake is released in a state in which the EPB apply is performed, the service brake can be automatically operated through the cooperative control with the AVH system configured to automatically maintain the braking force of the vehicle, which is stopped, without the driver stepping on the brake pedal, thereby preventing the vehicle from rocking in forward and backward directions.

What is claimed is:

1. A method for controlling an electronic control brake system of a vehicle which is mounted with a service brake configured to provide a braking force by hydraulic pressure to each wheel, and a drum in hat (DIH) brake configured to provide a parking braking force by pulling of a parking cable to each of the wheels, the method comprising:

determining whether rocking of the vehicle occurs due to a weight shift of the vehicle at the DIH brake on the basis of operation information of an electronic parking brake (EPB) system configured to adjust a braking force of the DIH brake, state information of a transmission gear, and state information of a brake pedal; and when the rocking of the vehicle is determined to occur, automatically operating the service brake.

2. The method of claim 1, wherein, when a parking and stopping gear is shifted into a driving gear after an EPB parking apply is performed, or the brake pedal is released at the driving gear after the EPB parking apply is performed, the rocking of the vehicle is determined to occur.

3. The method of claim 1, wherein, when the brake pedal is released in a state of a neutral gear of the vehicle on a slope after the EPB parking apply is performed, the rocking of the vehicle is determined to occur.

4. The method of claim 1, wherein the operating of the service brake includes automatically operating the service brake using an auto vehicle hold (AVH) function of an AVH system that automatically maintains a braking force of the vehicle, which is stopped, without the driver stepping on the brake pedal.

5. A method for controlling an electronic control brake system of a vehicle which is mounted with a service brake configured to provide a braking force by hydraulic pressure to each wheel, and a drum in hat (DIH) brake configured to provide a parking braking force by pulling of a parking cable to each of the wheels, the method comprising:
- determining whether at least one of conditions is satisfied based on received information, wherein the received information includes operation information of an electronic parking brake (EPB) system configured to adjust a braking force of the DIH brake, state information of a transmission gear, gradient information of the vehicle, and state information of a brake pedal; and
- automatically operating the service brake when the at least one of the conditions is satisfied,
- wherein the conditions include a first condition in which a parking and stopping gear is shifted into a driving gear after the EPB parking apply is performed, a second condition in which the brake pedal is released at the driving gear after the EPB parking apply is performed, and a third condition in which the brake pedal is released in a state of a neutral gear of the vehicle on a slope after the EPB parking apply is performed.

6. An electronic control brake system of a vehicle which is mounted with a service brake configured to provide a braking force by hydraulic pressure to each wheel, and a drum in hat (DIH) brake configured to provide a parking braking force by pulling of a parking cable to each of the wheels, the system comprising:
- an electronic parking brake (EPB) system configured to control the parking braking force of the DIH brake using an EPB actuator that operates the DIH brake; and
- an auto vehicle hold (AVH) system connected to the EPB system through a network, and configured to control the braking force of the service brake using a hydraulic pressure actuator that adjusts brake hydraulic pressure provided to the service brake,
- wherein the EPB system determines whether rocking of the vehicle occurs due to a weight shift of the vehicle at the DIH brake on the basis of operation information of the EPB system, state information of a transmission gear, gradient information of the vehicle, and state information of a brake pedal, and, when the rocking of the vehicle is determined to occur, the EPB system requests the AVH system to operate the service brake, and
- according to the request from the EPB system, the AVH system operates the service brake.

7. The electronic control brake system of claim 6, wherein, when at least one of conditions is satisfied, the rocking of the vehicle is determined to occur,
- wherein the conditions include a first condition in which a parking and stopping gear is shifted into a driving gear after the EPB parking apply is performed, a second condition in which the brake pedal is released at the driving gear after the EPB parking apply is performed, and a third condition in which the brake pedal is released in a state of a neutral gear of the vehicle on a slope after the EPB parking apply is performed.

8. An electronic control brake system of a vehicle which is mounted with a service brake configured to provide a braking force by hydraulic pressure to each wheel, and a drum in hat (DIH) brake configured to provide a parking braking force by pulling of a parking cable to each of the wheels, the system comprising:
- an electronic parking brake (EPB) system configured to control the parking braking force of the DIH brake using an EPB actuator that operates the DIH brake; and
- an auto vehicle hold (AVH) system connected to the EPB system through a network, and configured to control the braking force of the service brake using a hydraulic pressure actuator that adjusts brake hydraulic pressure provided to the service brake,
- wherein the EPB system determines whether at least one of conditions is satisfied based on received information, wherein the received information includes operation information of the EPB system, state information of a transmission gear, gradient information of the vehicle, and state information of the brake pedal, and, when the at least one case is determined to be satisfied, the EPB system requests the AVH system to operate the service brake, and
- according to the request from the EPB system, the AVH system operates the service brake,
- wherein the conditions include a first condition in which a parking and stopping gear is shifted into a driving gear after the EPB parking apply is performed, a second condition in which the brake pedal is released at the driving gear after the EPB parking apply is performed, and a third condition in which the brake pedal is released in a state of a neutral gear of the vehicle on a slope after the EPB parking apply is performed.

* * * * *